3,614,851
METHOD OF ENCAPSULATING LIQUID
Sydney James Green, London, England, assignor to Brown and Williamson Tobacco Corporation, Louisville, Ky.
No Drawing. Filed Apr. 16, 1969, Ser. No. 816,841
Claims priority, application Great Britain, Apr. 19, 1968, 18,560/68
Int. Cl. B65b 63/08
U.S. Cl. 53—25                                                     5 Claims

ABSTRACT OF THE DISCLOSURE

The invention provides a method of encapsulating a liquid substance, in which a tube is filled with the substance, is subjected to freezing to solidify the substance, and is cut into lengths whose ends are then sealed, the tube lengths being finally allowed to warm so that the encapsulated substance becomes liquid. Capsules so produced are especially suitable for incorporation in smoking articles. Thus the encapsulated substance may be a substance which, on release from the capsule, will improve or enhance the quality of the smoke provided by the smoking article and/or will serve as a smoke-filtering and/or filter-moistening substance.

---

This invention concerns improvements relating to smoking articles, particularly cigarettes, and to filters therefor.

Various substances are known which can be added to tobacco or to smoke-filter materials to improve or enhance the quality of the smoke, for instance by imparting their individual flavour characteristics to the smoke from the burning tobacco. A difficulty encountered in using such substances is that some of the more desirable substances, for example menthol, are volatile and may escape from the smoking articles, particularly after the outer seal of the package has been broken.

It has accordingly been proposed that flavour substances should be encapsulated and added in encapsulated form to the smoking article or filter. There they can be liberated, just before smoking, by rupture of the capsule or capsules or, on smoking, by destruction of the capsule or capsules by the effect of the burning of the tobacco.

It has also been proposed that encapsulation should be employed as a means for providing a filtering substance or a filter-moistening substance to be liberated just before smoking.

The present invention seeks to provide improved means for encapsulating liquid substances, especially such for use in smoking articles in any of the ways previously referred to.

According to the invention, a tube is filled with the substance, is subjected to freezing and is cut to lengths whose ends are then sealed, the tube lengths being finally allowed to warm. The tube may be filled completely with the substance or with a number of separated charges thereof.

The tube is preferably flexible and may be made of a thermoplastic material. It may be of round or flattened form. It may be subjected to freezing by being immersed in or passed through a freezing agent. The ends of the cut tubes may be simply sealed or they may be covered by frangible caps in such a way that, on squeezing the tube when the contents are in liquid form, the seals or caps will be broken. Thus, sealing of the ends of the cut lengths may be effected by dipping into a solidifiable sealing medium, by fusion or self-adhesion or by the application of caps secured by self-adhesive, applied adhesive or fusion. The sealed lengths are then ready to be incorporated in cigarette filters or in cigarettes.

The invention is applicable with particular advantage to the encapsulation of aqueous systems which expand on freezing and contract when the tube lengths are allowed to warm and their contents return to the liquid state.

Examples of ways in which the invention has been carried into effect will now be more fully described:

EXAMPLE I

A section of plasticized polyvinyl chloride tubing of length approximately one metre and of outside diameter 6.7 mm.±0.1 mm. and inside diameter 5 mm. was filled with water and immersed in an acetone/Dry Ice mixture for 4–5 minutes. The tube with its frozen contents was removed from the mixture and cut into sections each 7 mm. long. It was found that cutting was facilitated if the tube was first allowed to warm slightly, i.e. for 30 seconds at room temperature. The ends of each section were immediately sealed by dipping into a bath of a molten rosin-based sealing material. The material used was that supplied under the name "Pioneer E. 15 resin" by Frederick Boehm Ltd. The sealed capsules produced were finally allowed to warm at room temperature, so that the water filling melted. Sealed capsules with rupturable ends were thus obtained.

EXAMPLE II

Plasticized polyinvyl chloride tubing as described in Example I was filled with water using a peristaltic pump which provided alternate sections of water charge and air each 12 mm. long. The tubing was frozen as in Example I and cut into 24 mm. lengths by bisection of the air sections. The ends of the sections were sealed as in Example I by dipping into a bath of molten rosin-based sealing material so forming a sealed rupturable capsule.

Capsules produced in accordance with the invention may contain only water or they may contain solutions or emulsions or suspensions of substances known to improve or enhance the quality of tobacco smoke. Such substances include, among others, sodium acetate, zinc acetate, trisodium orthophosphate and menthol. Encapsulated substances such as the inorganic salts mentioned above and/or polyethylene imine may be incorporated in the smoking article in a tobacco section or in a filter section or between such sections, where their smoke-modifying action will be initiated or enhanced when the capsule contents are released. Encapsulated water or other liquid substances having themselves smoke-filtering properties or capable of improving, by moistening, the filtering properties of other filtering material may similarly be incorporated in a filter section of the smoking article.

The filtering material employed in conjunction with these capsules may be of filamentary, fibrous sheet or foam material. More than one filter section may be provided. Even plain water added to filtering material which contains no additive may have a considerable effect in enhancing its filtrational properties.

The following table shows the results obtained when the smoke removal by comparable cigarette filters, of 15 mm. length, of two different kinds was determined in a dry state and when wetted with 100 mg. of added water.

| Component removed | Paper filter, percent removal | | Filamentary cellulose acetate filter, percent removal | |
|---|---|---|---|---|
| | Dry | Wet | Dry | Wet |
| Tar (after baking) | 42 | 40 | 24 | 28 |
| Nicotine | 42 | 40 | 24 | 28 |
| Phenols | 48 | 48 | 35 | 78 |
| Acids | 49 | 64 | 40 | 70 |
| Aldehydes | <10 | 16 | <10 | <10 |
| Hydrogen cyanide | 22 | 43 | 20 | 52 |
| Hydrogen sulphide | <10 | 17 | <10 | <10 |

An alternative method of sealing the ends of the cut tube sections with their frozen contents would be to apply sealing caps made of a clear, adhesive, cellulose-type tape material such as that supplied by Minnesota Minning and Manufacturing Co. Ltd. under the trademark "Scotch."

I claim:

1. A method for encapsulating a liquid substance which comprises substantially filling a tubular member with said liquid substance; freezing said liquid substance in the tubular member; cutting frozen substance and tubular member into a plurality of segments and then sealing the ends of each segment prior to the thawing of the liquid substance.

2. A method according to claim 1, wherein the tube is completely filled with the substance.

3. A method according to claim 1, wherein the tube is filled with a number of separated charges of the substance.

4. A method according to claim 1, wherein the tube is made of a flexible thermoplastic material.

5. A method according to claim 1, wherein the substance is water.

References Cited

UNITED STATES PATENTS

| | | | |
|---|---|---|---|
| 2,468,060 | 4/1949 | Gunnell | 269—28 |
| 2,863,461 | 12/1958 | Frost, Jr. | 131—10.1 |
| 3,334,636 | 8/1967 | Zuber | 131—10.1 |
| 3,390,686 | 7/1968 | Irby, Jr., et al. | 131—10.1 |
| 1,628,333 | 5/1927 | Schaub | 53—25 |
| 2,335,799 | 11/1943 | Schwab | 53—25 |
| 2,508,197 | 5/1950 | Singer | 53—25 |

FOREIGN PATENTS

| 739,152 | 10/1955 | England | 269—4 |
|---|---|---|---|

ROBERT F. WHITE, Primary Examiner

J. R. HALL, Assistant Examiner

U.S. Cl. X.R.

264—28, 157